United States Patent [19]
Chow

[11] Patent Number: 5,385,397
[45] Date of Patent: Jan. 31, 1995

[54] STACKABLE COMPACT DISC CAROUSEL

[76] Inventor: Gary Chow, #207-1508 Mariners Walk, Vancouver, British Columbia, Canada, V6J 4X9

[21] Appl. No.: 16,464

[22] Filed: Feb. 11, 1993

Related U.S. Application Data

[63] Continuation-in-part of Ser. No. 880,690, May 8, 1992, abandoned.

[51] Int. Cl.⁶ .............................................. A47F 1/04
[52] U.S. Cl. ..................... 312/9.45; 211/40; 211/163
[58] Field of Search ............. 312/9.45, 9.46, 9.52, 312/9.63; 211/40, 41, 78, 163, 194

[56] References Cited

U.S. PATENT DOCUMENTS

| | | | |
|---|---|---|---|
| 689,213 | 12/1901 | Nicholson | 211/78 |
| 1,381,525 | 6/1921 | Wagoner et al. | |
| 2,690,843 | 10/1954 | Ament | |
| 3,255,890 | 6/1966 | Gerber | 211/163 |
| 3,337,059 | 8/1967 | Le Hoy | |
| 3,341,266 | 9/1967 | Schecter et al. | |
| 3,843,221 | 10/1974 | Klaus et al. | |
| 3,938,665 | 2/1976 | Rumble | |
| 4,014,437 | 3/1977 | Rumble et al. | |
| 4,030,608 | 6/1977 | Howard | |
| 4,221,440 | 9/1980 | Morgan | |
| 4,938,549 | 7/1990 | Potter | |
| 5,031,779 | 7/1991 | Szenay et al. | 211/40 |
| 5,176,264 | 1/1993 | De Palma | 211/40 |
| 5,253,767 | 10/1993 | Koeppel | 211/40 |

Primary Examiner—Rodney M. Lindsey
Attorney, Agent, or Firm—Norman M. Cameron

[57] ABSTRACT

A stackable storage rack receives thin, flat objects such as compact disc cases. The rack includes a turntable with radially extending grooves for receiving the objects. The base has portions thereof extending radially outwards beyond the turntable. There is a spindle and bearing for rotatably mounting the turntable on the base. A plurality of elongated rods extend perpendicularly from the top of the base on the portions thereof. There are sockets on the bottom of the base for releasibly receiving tops of rods of another rack. A plurality of racks can thereby be stacked one upon the other.

20 Claims, 2 Drawing Sheets

STACKABLE COMPACT DISC CAROUSEL

RELATED APPLICATION

This application is a continuation-in-part of U.S. patent application Ser. No. 07/880,690 filed May 8, 1992 now abandoned.

BACKGROUND OF THE INVENTION

1. Field of the Invention

This invention relates to storage devices for compact disc cases or other thin, flat objects and, in particular, to stackable carousels.

2. Description of Related Art

Many different storage devices have been developed for compact disc cases or other thin, flat objects. For example, there are some containers which hold a stack of compact disc cases in a manner similar to a stack of files. The compact discs, or more accurately their storage cases, can be flipped through similar to index cards. Other devices have been proposed where the compact disc cases or the like are held by carousels which can be rotated. Most such carousels do not allow visual access to the sides of each compact disc case so that the user can easily recognize a desired selection. Furthermore, many such carousels are relatively complex and cannot be conveniently stacked to make maximum use of available storage space.

It is an object of this invention to provide an improved rack for compact disc cases or similar thin, flat objects which is simple and rugged in construction but aesthetically pleasing at the same time.

It is also an object of the invention to provide an improved storage rack of this type with provision for stacking a plurality of such racks one upon the other to increase the potential storage capacity of a particular location.

It is a further object of the invention to provide an improved storage carousel for compact disc cases or the like which allows the user to see at least one side of each compact disc case to make desired selections easier.

SUMMARY OF THE INVENTION

In accordance with these objects, there is provided a stackable storage rack for thin objects such as compact disc cases. The rack includes a turntable with radially extending grooves for receiving the objects. There is a base having a top, a bottom and portions extending radially outwards beyond the turntable. There is means for rotatably mounting the turntable on the base. A plurality of elongated members extend perpendicularly from the top of the base on said portions thereof. The members have tops. There is means on the bottom of the base for releasibly receiving said tops of said members of another said rack. A plurality of said racks therefore can be stacked on each other.

DESCRIPTION OF THE PREFERRED EMBODIMENTS

Figure 1:
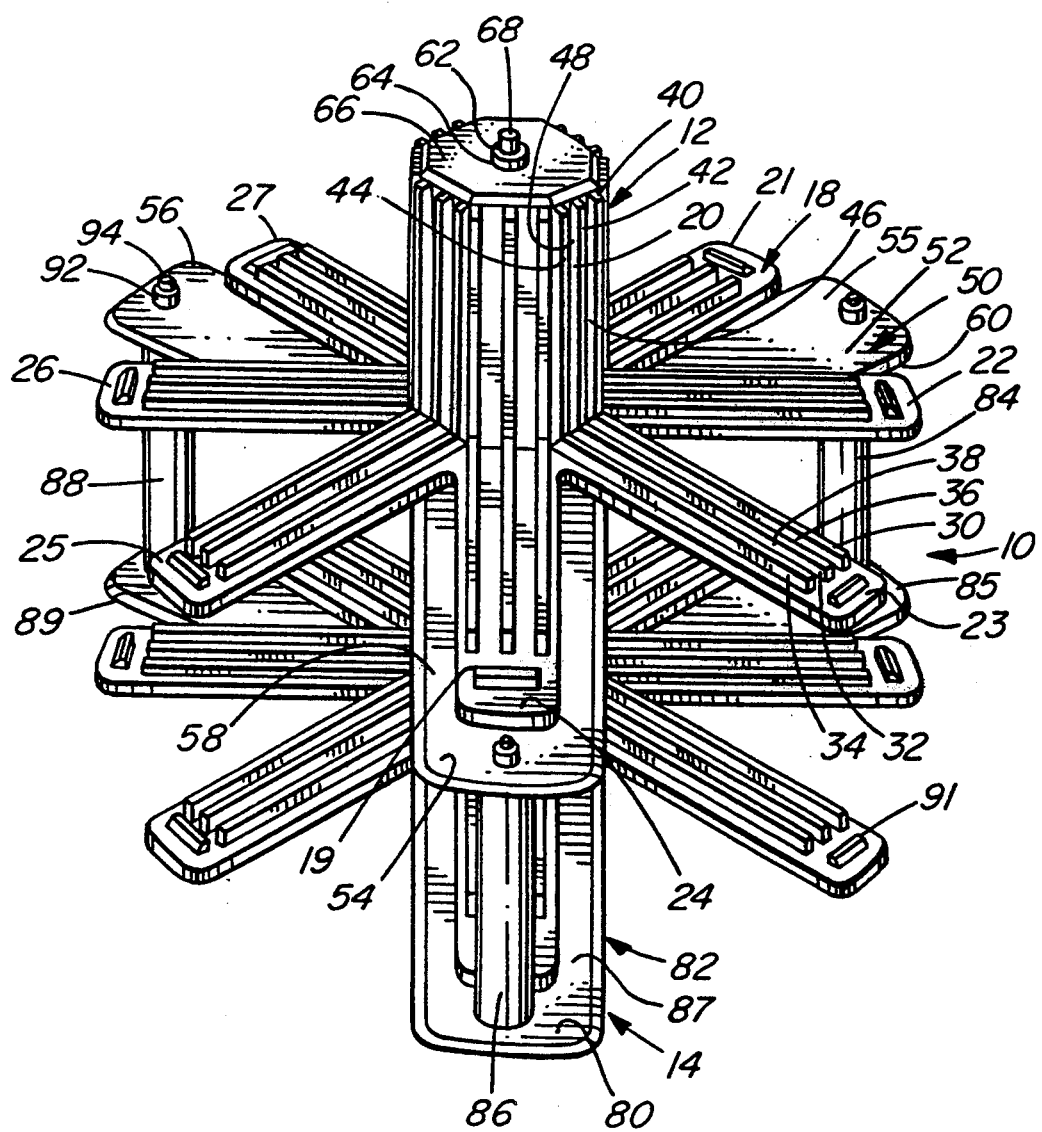
FIG. 1 is a top, side isometric view of two storage racks for compact discs according to a first embodiment of the invention, one rack being stacked upon another.
Figure 2:
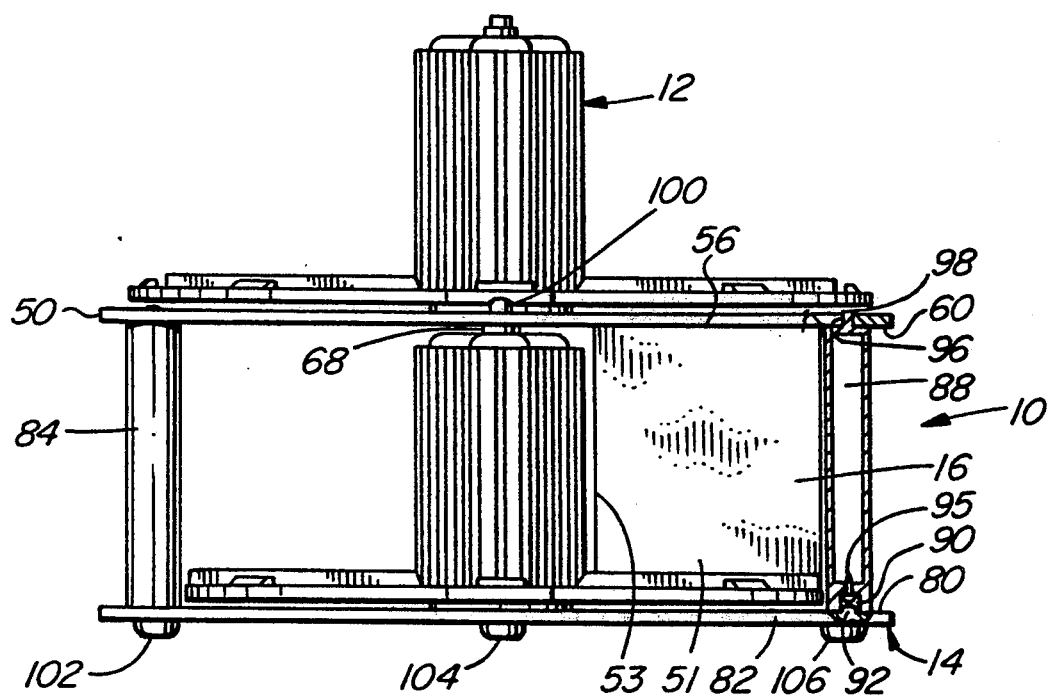
FIG. 2 is a side elevation of the pair of racks of FIG. 1 with portions thereof being broken away.

Referring to FIG. 1, this illustrates a pair 10 of storage racks 12 and 14. Rack 12 is stacked on top of rack 14. Both racks are shaped and configured to receive a plurality of compact disc storage cases 16 as shown in FIG. 2. Similar racks could be adapted for other thin, flat objects.

Each rack is substantially the same and thus will be initially described with reference to rack 12 only. Rack 12 includes a turntable shown generally at 18 which has a portion 19 extending horizontally from a central hub 20. In this embodiment, the horizontally extending portion includes a plurality of arms 21, 22, 23, 24, 25, 26 and 27. There is an eighth arm opposite arm 24 which is hidden by the hub 20. Thus there is a total of eight arms in this embodiment although the exact number is not critical. The arms are angularly spaced-apart by 45 degrees with respect to each other in this example. The arms and the central hub 20 of the turntable are preferably a single piece of material such as a hard plastic molding.

Each of the arms has three parallel ribs thereon, for example, ribs 30, 32 and 34 on arm 23. A pair of horizontal, parallel grooves 36 and 38 extend between the ribs on each arm. References to horizontal or vertical orientations herein refer to the working position of the racks as shown in FIG. 1.

The central hub 20 has vertical ribs aligned with each of the ribs on the arms, for example ribs 40, 42 and 44 which are aligned with the ribs 30, 32 and 34 on arm 23. Similarly there are vertical grooves 46 and 48 which are aligned with grooves 36 and 38 on the arm. The grooves 36 and 38 receive the bottoms of compact disc cases such as bottom 51 of case 16 in FIG. 2. End 53 of the case is received within the vertical grooves on the hubs such as grooves 46 and 48 in FIG. 1.

Because the arms of the turntable are angularly spaced apart, one side of each compact disc case can be seen in the space between adjacent arms. The second side of each case is hidden if there is another case in the adjacent groove.

Figure 3:
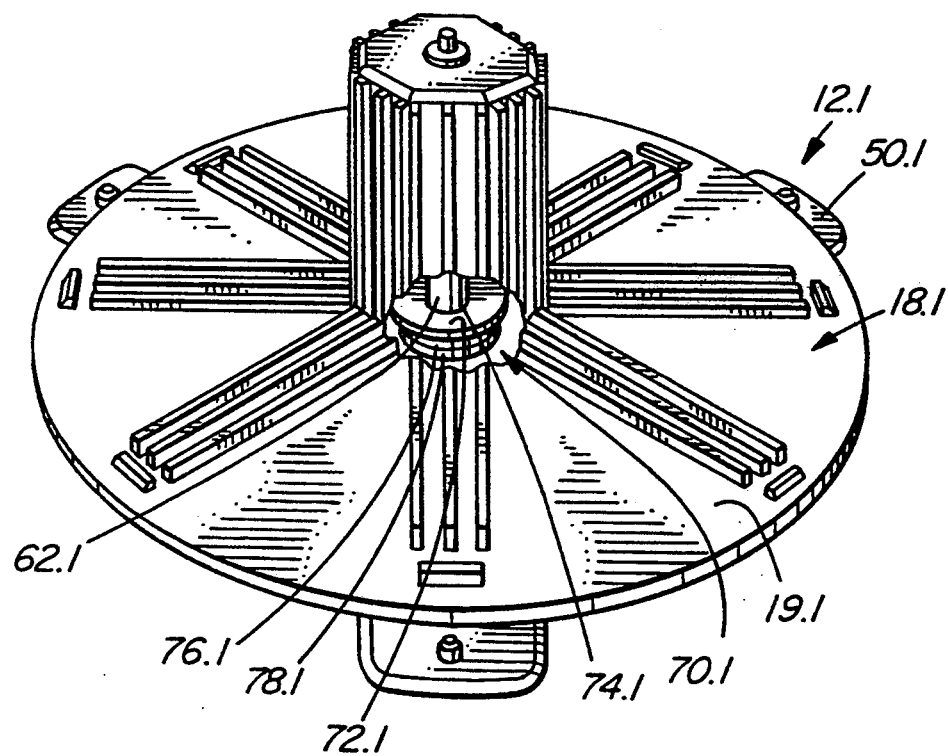
FIG. 3 is a top, side isometric view of a compact disc storage rack according to a second embodiment of the invention with a portion of the turntable thereof being broken away to show the bearing.

FIG. 3 shows a rack 12.1 which is generally similar to racks 12 and 14 except that its turntable 18.1 has a disc-shaped horizontally extending portion 19.1 instead of separate arms. Otherwise the turntable is similar to the previous embodiments and similar parts are numbered the same with the addition of ".1".

Each rack has a base, such as base 50 of rack 12. In this particular example, base 50 has three angularly spaced-apart arms 52, 54 and 56 although this configuration is not critical. Outer ends of the arms of the base, for example outer end 55 of arm 52, extend radially outwards beyond the ends of the turntable arms as seen in FIG. 1. The base has a top 58 as shown on arm 54 and a bottom 60 as shown on arm 52.

A spindle 62 extends vertically upwards from the center of the base perpendicular to the arms thereof. The spindle 62 extends rotatably through aperture 64 in top 66 of the hub 20. There is a protrusion 68 of reduced diameter on the top of the spindle.

There is a bearing assembly for rotatably mounting the turntable on the base shown best as bearing assembly 70.1 in the embodiment of FIG. 3. There is a disc 72.1 on the bottom of turntable 18.1 which is broken away at the center thereof to show the bearing assembly. There is an aperture 74.1 in the disc 72.1. Spindle 62.1 extends rotatably through this aperture.

There is a washer 76.1 mounted on the bottom of the disc 72.1. A similar washer 78.1 is mounted on the top of base 50.1. Both washers are of a low friction material, PTFE in this example. The relatively low friction between the two PTFE washers allows smooth and easy rotation of the turntable on the base.

Racks according to the invention are adapted to be stacked upon each other as shown by racks 12 and 14 in FIGS. 1 and 2. For this purpose there is a plurality of rods extending perpendicularly from the top 80 of the base 82 of rack 14. There are three such rods 84, 86 and 88 for the embodiment of FIGS. 1 and 2. The rods extend upwardly from the portion of each arm 85, 87 and 89 extending radially outwards beyond the arms of the turntable 91.

Each rod has a central socket 90 on the bottom thereof which fits over a corresponding protrusion 92 on top 80 of base 82. Protrusion 92 is best seen on arm 56 of the upper rack 12. Each such protrusion has a central aperture 94. This allows a screw 95 to be inserted upwardly from the bottom of the base to fixedly secure each rod to the base as seen in FIG. 2.

Each base has a socket 96 on the bottom of each arm as shown on arm 56 in FIG. 2. Each socket tightly and releasibly receives protrusion 98 on the top of one of the rods. As shown in FIG. 2, there is a central socket 100 on the bottom of the base for tightly, but releasibly receiving protrusion 68 on the top of the spindle of the turntable below. The mating sockets and protrusions allow the racks to be releasibly stacked on each other.

Optionally pads can be inserted into the sockets in the bottom of the base, such as pads 102, 104 and 106 as shown in FIG. 2. These are placed in the sockets in the base of the bottom rack similar to sockets 96 and 100 and are preferably made of rubber or another resilient substance. These provide good grip between the bottom rack and the surface upon which the stack of racks is placed and also prevent marring of the surface.

It will be understood by someone skilled in the art that many of the details described above are by way of example only and are not meant to limit the scope of the invention which is to be interpreted with reference to the following claims.

What is claimed is:

1. A stackable storage rack for thin, flat objects, the rack comprising:
   a turntable having radially extending grooves for receiving said objects;
   a base having a top, a bottom and portions thereof extending radially outwards beyond the turntable;
   means for rotatably mounting the turntable on the base;
   a plurality of elongated members extending perpendicularly from the top of the base on said portions thereof, said members having tops; and
   means on the bottom of the base for releasibly receiving said tops of said members of another said rack, whereby a plurality of said racks can be stacked on each other.

2. A storage rack as claimed in claim 1, wherein the means on the bottom of the base comprises a plurality of sockets.

3. A storage rack as claimed in claim 2, wherein the tops of the members have protrusions for fitting in the sockets.

4. A storage rack as claimed in claim 1, wherein the members are releasibly connected to the portions of the base.

5. A storage rack as claimed in claim 1, wherein the turntable has spaced-apart, parallel ribs thereon, the grooves being between adjacent said ribs.

6. A storage rack as claimed in claim 1, wherein the turntable has a horizontally extending portion with horizontal grooves for receiving bottoms of said objects and a central hub extending upwardly from the horizontally extending portion with vertical grooves for receiving ends of said objects which are perpendicular to the bottoms thereof.

7. A storage rack as claimed in claim 1, wherein the means for rotatably mounting includes a spindle extending perpendicularly upwards from the base.

8. A storage rack as claimed in claim 7, wherein the spindle is fixedly secured to the base, the turntable being rotatable on the spindle.

9. A storage rack as claimed in claim 8, wherein the means for rotatably mounting includes a bearing between the base and the turntable.

10. A storage rack as claimed in claim 1, wherein the grooves are arranged in a plurality of pairs of adjacent, parallel grooves, the pairs of grooves being angularly spaced-apart from each other sufficiently to view one side of each said object.

11. A storage rack as claimed in claim 1, wherein the elongated members are rods.

12. A storage rack as claimed in claim 6, wherein the horizontally extending portion of the turntable comprise a plurality of angularly spaced-apart arms.

13. A storage rack as claimed in claim 6, wherein the horizontally extending portion of the turntable is a disc.

14. A storage rack as claimed in claim 1, wherein the base has a center and comprises a plurality of angularly spaced-apart arms connected together at the center of the base.

15. A storage rack for compact disc cases, comprising:
   a pair of first and second carousels, each said carousel having a base with a center, a top, a bottom and a plurality of angularly spaced-apart arms, a spindle extending upwardly from the center of the base, a turntable fitted over the spindle and a bearing between the turntable and the base which permits manual rotation of the turntable with respect to the base, the turntable having a horizontally extending bottom portion with a plurality of spaced-apart, radially extending ribs having grooves therebetween for receiving bottoms of the compact disc cases, and a central hub which extends perpendicularly upwards from the horizontally extending portion with vertical, spaced-apart ribs thereon having grooves therebetween for receiving ends of said cases, the grooves being arranged in pairs of adjacent, parallel grooves, the pairs of grooves being angularly spaced-apart sufficiently to view at least one side of each said compact disc case; said second carousel being mounted above said first carousel by means of a plurality of spaced-apart rods perpendicularly extending from the top of the base of said first carousel to the bottom of the base of said second carousel, the rods being connected to portions of the bases extending radially outwards beyond said turntables.

16. A storage rack as claimed in claim 15, wherein the horizontally extending portion of each said turntable is disc-shaped.

17. A storage rack as claimed in claim 15, wherein the horizontally extending portion of each said turntable has a plurality of spaced-apart arms connected to the central hub.

18. A storage rack as claimed in claim 15, wherein the rods have tops which are releasibly secured to the bottom of the base of the second turntable.

19. A storage rack as claimed in claim 18, wherein the rods have protrusions on the tops thereof and the base of the second turntable has sockets in the bottom thereof which tightly and releasibly receive the protrusions on the tops of the rods.

20. A storage rack as claimed in claim 15, wherein the spindle of the first carousel has a top with a protrusion thereon and the base of the second carousel has a central socket which tightly and releasibly receives the protrusion on the top of the spindle the first carousel.

* * * * *